United States Patent
Zhong et al.

(10) Patent No.: US 12,255,311 B2
(45) Date of Patent: *Mar. 18, 2025

(54) CATHODE, ELECTROCHEMICAL DEVICE AND ELECTRONIC DEVICE INCLUDING THE SAME

(71) Applicant: Ningde Amperex Technology Limited, Ningde (CN)

(72) Inventors: Huawei Zhong, Ningde (CN); Chaowang Lin, Ningde (CN); Fan Yang, Ningde (CN); Yisong Su, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 315 days.

This patent is subject to a terminal disclaimer.

(21) Appl. No.: 17/476,896

(22) Filed: Sep. 16, 2021

(65) Prior Publication Data
US 2022/0006073 A1    Jan. 6, 2022

Related U.S. Application Data

(63) Continuation of application No. 16/416,489, filed on May 20, 2019, now Pat. No. 11,177,469.

(30) Foreign Application Priority Data

Nov. 5, 2018 (CN) .......................... 201811309416.6

(51) Int. Cl.
*H01M 4/139* (2010.01)
*H01M 4/62* (2006.01)
(Continued)

(52) U.S. Cl.
CPC ........... *H01M 4/139* (2013.01); *H01M 4/623* (2013.01); *H01M 4/625* (2013.01);
(Continued)

(58) Field of Classification Search
CPC ...... H01M 4/139; H01M 4/623; H01M 4/625; H01M 10/0525; H01M 2004/021; H01M 2004/028
See application file for complete search history.

(56) References Cited

U.S. PATENT DOCUMENTS

2004/0234850 A1   11/2004   Watarai et al.
2012/0052382 A1   3/2012    Yoshida et al.
(Continued)

FOREIGN PATENT DOCUMENTS

CN        1881660 A       12/2006
CN        100338800 C     9/2007
(Continued)

OTHER PUBLICATIONS

Notification of Granting Invention Patent Right issued on Jun. 12, 2023, in corresponding Chinese Application No. 202110959944.1, 10 pages.
(Continued)

*Primary Examiner* — Osei K Amponsah
(74) *Attorney, Agent, or Firm* — Maier & Maier, PLLC

(57) ABSTRACT

An electrochemical device includes a cathode including a cathode current collector, a first cathode active material layer including a first cathode active material, and a second cathode active material layer including a second cathode active material. The first cathode active material layer is disposed between the cathode current collector and the second cathode active material layer, and the first cathode active material layer is formed on at least one surface of the cathode current collector. The first cathode active material layer is firstly formed on the cathode current collector, and the second cathode active material layer is secondly formed on the first cathode active material layer, then the second
(Continued)

cathode active material layer and the first cathode active material layer are pressed together.

20 Claims, 4 Drawing Sheets

(51) Int. Cl.
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2013/0029216 A1* | 1/2013 | Kim | C01G 45/1242 429/188 |
| 2013/0147439 A1* | 6/2013 | Takahashi | H02J 7/0013 429/211 |
| 2013/0209865 A1 | 8/2013 | Kim et al. | |
| 2016/0308208 A1 | 10/2016 | He et al. | |
| 2017/0005334 A1 | 1/2017 | Takaichi et al. | |
| 2019/0036154 A1* | 1/2019 | Kim | H01M 4/525 |

FOREIGN PATENT DOCUMENTS

| | | |
|---|---|---|
| CN | 201153140 | 11/2008 |
| CN | 103165856 A | 6/2013 |
| CN | 103563131 A | 2/2014 |
| CN | 104201342 A | 12/2014 |
| CN | 105074967 A | 11/2015 |
| CN | 105098193 A | 11/2015 |
| CN | 105580164 A | 5/2016 |
| CN | 106486639 A | 3/2017 |
| CN | 106816575 A | 6/2017 |
| CN | 108475772 A | 8/2018 |
| JP | 200479327 A | 3/2004 |
| JP | 2010108624 | 5/2010 |
| JP | 2010231950 A | 10/2010 |
| JP | 2018107007 A | 7/2018 |
| WO | 2018097562 A1 | 5/2018 |
| WO | 2018107743 A1 | 6/2018 |

OTHER PUBLICATIONS

Office Action issued on Dec. 2, 2022, in corresponding Chinese Application No. 202110959944.1, 18 pages.
Notification of Granting Invention Patent Right issued on Jul. 26, 2023, in corresponding Chinese Application No. 202110960980.X, 4 pages.
Office Action issued on Dec. 22, 2022, in corresponding Chinese Application No. 202110960980.X, 18 pages.
Office Action issued on May 12, 2023, in corresponding Chinese Application No. 202110960980.X, 20 pages.
Chinese Office Action and Search Report, issued Mar. 5, 2020 in counterpart Chinese Patent Application 201811309416.6, 7 pages in Chinese.
Chinese Third Office Action and Search Report mailed Jan. 12, 2021 in counterpart Chinese Application 201811309416.6, 5 pages in Chinese.
Chinese Decision of Rejection mailed Jun. 2, 2021 in counterpart Chinese Application 201811309416.6, 4 pages in Chinese and 1 page relevant English translation.
Masaki et al., "Lithium-ion Batteries Science and Technologies," p. 92, Chinese edition, Chemical Industry Press (2009), in Chinese with English abstract.
Office Action issued on May 8, 2024, in related U.S. Appl. No. 17/476,878, 9 pages.

* cited by examiner

CATHODE, ELECTROCHEMICAL DEVICE AND ELECTRONIC DEVICE INCLUDING THE SAME

CROSS REFERENCE TO RELATED APPLICATIONS

The present application is a continuation application of a U.S. patent application Ser. No. 16/416,489, filed on May 20, 2019, which claims the benefit of priority from the China Patent Application Serial No. 201811309416.6, filed on 5 Nov. 2018, the disclosures of which are hereby incorporated by reference in their entirety.

BACKGROUND

1. Technical Field

Embodiments of the present application relate to the field of electrochemical devices, and more particularly, to cathodes and a lithium-ion battery.

2. Description of the Related Art

Electrochemical devices (for example, lithium-ion batteries) have entered our daily lives with advances in technology and environmental protection. With the popularity of lithium-ion batteries, the safety problems caused by external force puncturing of lithium-ion batteries occasionally appear at the user end, and their safety performance has received more and more attention. In particular, the recurring occurrence of some mobile phone explosions has caused users, post-sale services and lithium-ion battery manufacturers to put forward new requirements for the safety performance of lithium-ion batteries.

At present, the method for improving the safety of lithium-ion batteries comes at the expense of the energy density of lithium-ion batteries. Therefore, it is vital to provide a technical means capable of significantly improving the safety performance of lithium-ion batteries under high energy density conditions.

SUMMARY

The embodiments of the present application are directed to a cathode, of which an active material layer adopts a two-layer structure and forms a transition layer between the upper and lower active material layers to enhance the adhesion between the upper and lower active material layers such that the electrochemical device has high energy density and good cycle characteristics, thereby effectively enhancing the safety performance of the electrochemical device in a nail penetration test.

Some embodiments of the present application provide a cathode including a cathode current collector, a first cathode active material layer and a second cathode active material layer. The first cathode active material layer includes a first cathode active material. The second cathode active material layer includes a second cathode active material. Wherein the first cathode active material layer is disposed between the cathode current collector and the second cathode active material layer, and the first cathode active material layer is formed on at least one surface of the cathode current collector; and the second cathode active material is embedded in the first cathode active material layer and forms a continuous transition layer with the first cathode active material at an interface between the first cathode active material layer and the second cathode active material layer.

According to some embodiments of the present application, the thickness of the first cathode active material layer is in a range of about 0.5 μm to about 30 μm, and the thickness of the second cathode active material layer is in a range of about 30 μm to about 80 μm.

According to some embodiments of the present application, the particle size with a cumulative volume of 90% of the first cathode active material is about 30 μm or less, and the particle size of 90% of the cumulative volume refers to a particle size which accounts for 90% of the cumulative volume of the small particle size side in volume-based particle size distribution.

According to some embodiments of the present application, the average particle size of the first cathode active material is about 0.2 μm to about 15 μm, and the ratio of the average particle size of the first cathode active material to the average particle size of the second cathode active material is about 1:1 to about 1:40.

According to some embodiments of the present application, the first cathode active material and the second cathode active material are each independently selected from the group consisting of lithium cobaltate, lithium iron phosphate, sodium iron phosphate, lithium manganese iron phosphate, lithium vanadium phosphate, sodium vanadium phosphate, oxy-lithium-vanadium phosphate, sodium vanadium oxy-phosphate, lithium vanadate, lithium manganate, lithium nickelate, lithium nickel cobalt manganese oxide, lithium-rich manganese-based material, lithium nickel cobalt aluminum oxide, lithium titanate and combinations thereof.

According to some embodiments of the present application, the first cathode active material layer, the second cathode active material layer and the transition layer includes a binder, and the binder is selected from the group consisting of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene butadiene rubber and combinations thereof.

According to some embodiments of the present application, the content of the binder of the first cathode active material layer is about 1.5 wt % to about 6 wt % based on the total weight of the first cathode active material layer, and the content of the binder of the second cathode active material layer is about 0.5 wt % to about 4 wt % based on the total weight of the second cathode active material layer.

According to some embodiments of the present application, the content of the binder of the first cathode active material layer is greater than the content of the binder of the second cathode active material layer.

According to some embodiments of the present application, the content of the binder of the transition layer is greater than the content of the binder of the first cathode active material layer and the second cathode active material layer.

According to some embodiments of the present application, the first cathode active material layer includes a first conductive agent, and the second cathode active material layer includes a second conductive agent, wherein the first conductive agent and the second conductive agent are each independently selected from the group consisting of carbon nanotubes, conductive carbon black, acetylene black, graphene, Ketjen black and combinations thereof.

According to some embodiments of the present application, the content of the first conductive agent is about 0.5 wt % to about 5 wt % based on the total weight of the first cathode active material layer, and the content of the second conductive agent is about 0.5 wt % to about 5 wt % based on the total weight of the second cathode active material layer.

According to some embodiments of the present application, the ratio of the specific surface area of the first conductive agent to the specific surface area of the first cathode active material is about less than or equal to 11.

According to some embodiments of the present application, the specific surface area of the first cathode active material is about 0.2 $m^2/g$ to about 18 $m^2/g$.

Some embodiments of the present application provide an electrochemical device including the cathode in the above embodiments.

Some embodiments of the present application provide an electronic device including the electrochemical device in the above embodiments.

BRIEF DESCRIPTION OF THE DRAWINGS

Hereinafter, the drawings necessary to describe the embodiments of the present application or the prior art will be briefly described in order to facilitate the description of the embodiments of the present application. It is obvious that the drawings in the following description are only some of the embodiments in the present application. For those skilled in the art, drawings of other embodiments can still be obtained according to the structure illustrated in these drawings without the need for creative labor.

DETAILED DESCRIPTION

Figure 1:
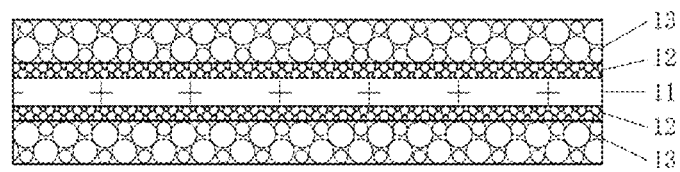
FIG. 1 is a schematic structural view of a cathode using a double cold pressing process.

The embodiments of the present application will be described in detail below. Throughout the specification, the same or similar components and components having the same or similar functions are denoted by like reference numerals. The embodiments described herein with respect to the drawings are illustrative and graphical, and are provided to provide a basic understanding of the present application. The embodiments of the present application should not be construed as limiting to the present invention.

In this specification, unless otherwise specified or limited, the relative terms such as "central", "longitudinal", "lateral", "front", "rear", "right", "left", "internal", "external", "lower", "higher", "horizontal", "vertical", "higher than", "lower than", "above", "below", "top" and "bottom", and their derivatives (e.g. "horizontally", "downward", "upward", etc.) should be interpreted as referring to the directions described in the discussion or in the drawings. These relative terms are used for convenience only in the description and are not required to construct or operate the present application in a particular direction.

In addition, amounts, ratios, and other numerical values are sometimes presented herein in a range format. It should be understood that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

Further, for convenience of description, "first", "second", "third" and the like may be used herein to distinguish different components of one drawing or series of drawings. Unless otherwise specified or limited, "first", "second", "third" and the like are not intended to describe the corresponding components.

As used herein, the term "about" is used to describe and explain minor changes. When used in conjunction with an event or situation, the terms may refer to examples where the event or situation occurs exactly and examples where the event or situation occurs very approximatively. For example, when used in conjunction with a numerical value, the terms may refer to a variation range that is less than or equal to the numerical value ±10% of, such as less than or equal to the numerical value ±5%, less than or equal to the numerical value ±4%, less than or equal to the numerical value ±3%, less than or equal to the numerical value ±2%, less than or equal to the numerical value ±1%, less than or equal to the numerical value ±0.5%, less than or equal to the numerical value ±0.1%, or less than or equal to the numerical value ±0.05%. In addition, amounts, ratios, and other numerical values are sometimes presented herein in a range format. It should be understood that such range formats are for convenience and brevity, and should be interpreted with flexibility, and include not only those numerical values that are specifically designated as range limitations, but also include all individual numerical values or sub-ranges that are within the range, as each value and sub-range is specified explicitly.

The embodiments of the present application provide a cathode, of which an active material layer adopts a two-layer structure and the active material layer adopts a technique of firstly coating two active material layers and then performing cold pressing together to form a transition layer between the first cathode active material layer and the second cathode active material layer, so as to effectively increase the adhesion between the first cathode active material layer and the second cathode active material layer and reduce the possibility of separation between the first cathode active material layer and the second cathode active material layer, thereby enhancing the safety performance of the lithium-ion battery in the corresponding test (i.e., a nail penetration test) while ensuring that the electrochemical device (such as a lithium-ion battery) has high energy density and cycle characteristics.

An electrode assembly of a lithium-ion battery typically includes a cathode, an anode, a separator, an electrolytic solution and the like. The anode includes a negative current collector and a negative active material layer coated on the negative current collector. The cathode includes a cathode current collector, a cathode active material layer and the like. A cathode active material layer having a two-layer structure, i.e., a lower cathode active material layer having high adhesion and high resistance and an upper cathode active material layer having low adhesion and low resistance, is formed on the cathode current collector, so that a short-circuit mode between the cathode current collector and the negative active material layer when the lithium-ion battery damaged by an external force (such as nail penetration) is effectively avoided while maintaining the lithium-ion battery at high energy density, thereby avoiding the flammable failure of the lithium-ion battery.

However, when preparing the cathode having the active material layer in the two-layer structure, if the lower cathode active material layer is firstly dried and cold-pressed and then the upper cathode active material layer is coated for drying and cold pressing, the above process will cause an obvious interface formed between the lower cathode active material layer and the upper cathode active material layer, so that the contact area between the upper and lower cathode active material layers is reduced, thereby reducing the adhesion between the upper cathode active material layer and the lower cathode active material layer, and causing an increase in the interface impedance between the upper cathode active material layer and the lower cathode active material layer, which affects the electrochemical performance of the lithium-ion battery.

Figure 2:
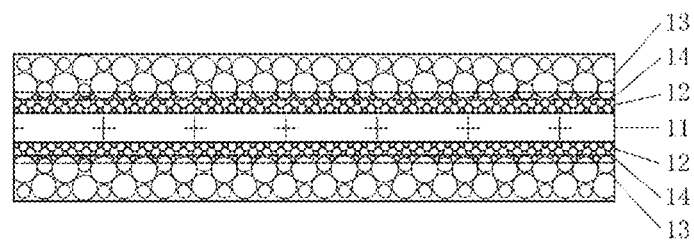
FIG. 2 is a schematic structural view of a cathode according to some embodiments of the present application.

The technical advantages of the cathode active material layer provided by the embodiments of the present application will be described below with reference to FIG. 1 and FIG. 2. FIG. 1 is a schematic structural view of a cathode having an active material layer in a two-layer structure obtained by using a double cold pressing process. FIG. 2 is a schematic structural view of a cathode according to some embodiments of the present application.

FIG. 1 shows a cathode having an active material layer in a two-layer structure obtained by using a double cold pressing process, the surface of a cathode current collector 11 thereof is provided with two active material layers 12 and 13, and an obvious interface is present between the active material layers 12 and 13. For better differentiation, the active material layer 12 will hereinafter be referred to as a first cathode active material layer, and the active material layer 13 will be referred to as a second cathode active material layer. Those skilled in the art will understand that this is only for the purpose of better description and is not intended to limit the present application.

The preparation technique of the cathode having the active material layer in a two-layer structure shown in FIG. 1 is performed by two cold pressing treatments. That is, a first cathode active material layer slurry is firstly coated on the surface of the cathode current collector 11, wherein the first cathode active material layer slurry may include a binder and a first conductive agent, then the first cathode active material layer slurry is dried and then subjected to primary cold pressing to form the first cathode active material layer, a second cathode active material layer slurry is then coated on the cold-pressed first cathode active material layer, wherein the second cathode active material layer slurry may include a binder and a second conductive agent, and the second cathode active material layer slurry is dried and then subjected to a secondary cold pressing to form the second cathode active material layer.

In the above preparation technique, since the first cathode active material layer is firstly subjected to the primary cold pressing, the particles of the first cathode active material in the first cathode active material layer are densely packed, so that the pores between the particles of the first cathode active material are small, and thus, the surface of the first cathode active material layer becomes smoother and flatter. When the coating of the second cathode active material layer slurry is performed, the second cathode active material layer slurry (for example, the second cathode active material particles) may have more difficulty penetrating or being embedded in the first cathode active material layer, thereby causing a reduced contact area, weak interaction force and insufficient adhesion between the first cathode active material layer and the second cathode active material layer. Further, since the adhesion effect of the binder in the first cathode active material layer to the first cathode active material layer after the primary cold pressing is enhanced, when the coating of the second cathode active material layer slurry is performed, the binder in the second cathode active material layer is not easily miscible with the binder in the first cathode active material layer, so that the adhesion between the first cathode active material layer and the second cathode active material layer is further diminished.

As shown in FIG. 1, due to the reduced contact area, weak interaction force and insufficient adhesion between the first cathode active material layer and the second cathode active material layer, the obvious interface tends to cause the second cathode active material layer to fall off, destroying the conductive network of the electrode assembly in the lithium-ion battery, thereby causing an increase in impedance in the electrode assembly, accelerating the capacity attenuation of the electrode assembly and lowering the service life of the electrode assembly.

Some embodiments of the present application provide a cathode to improve the problem of low adhesion between the first cathode active material layer and the second cathode active material layer by improving the preparation technique of the cathode having the active material layer in a two-layer structure.

As shown in FIG. 2, the cathode includes a cathode current collector 11, a first cathode active material layer 12 and a second cathode active material layer 13, wherein the first cathode active material layer 12 is disposed between the cathode current collector 11 and the second cathode active material layer 13, and the first cathode active material layer 12 is formed on at least one surface of the cathode current collector 11. The first cathode active material layer 12 and the second cathode active material layer 13 respectively contain a first cathode active material and a second cathode active material, wherein the second cathode active material is embedded in the first cathode active material layer 12 and forms a continuous transition layer 14 with the first cathode active material at an interface between the first cathode active material layer 12 and the second cathode active material layer 13.

Compared with the double cold pressing process, the embodiment of the present application adopts the following technique to prepare the cathode having an active material layer in a two-layer structure. A first cathode active material layer slurry is firstly coated on the surface of the cathode current collector 11, wherein the first cathode active material layer slurry may include a binder and a first conductive agent, the cathode active material layer slurry is dried, and then the first cathode active material layer 12 having loosely stacked particles and having abundant pores is formed. Next, a second cathode active material layer slurry is coated on the first cathode active material layer 12, wherein the second cathode active material layer may include a binder and a second conductive agent, and the second cathode active material layer slurry is dried to form the second cathode active material layer 13. Then, the second cathode active material layer 13 and the first cathode active material layer 12 are cold-pressed together to form the cathode having the active material layer in a two-layer structure, wherein the cold pressing pressure range is about 10 T to about 120 T and the belt running speed of cold pressing (i.e., cold pressing speed) is about 1 m/min to about 50 m/min.

Figure 3:
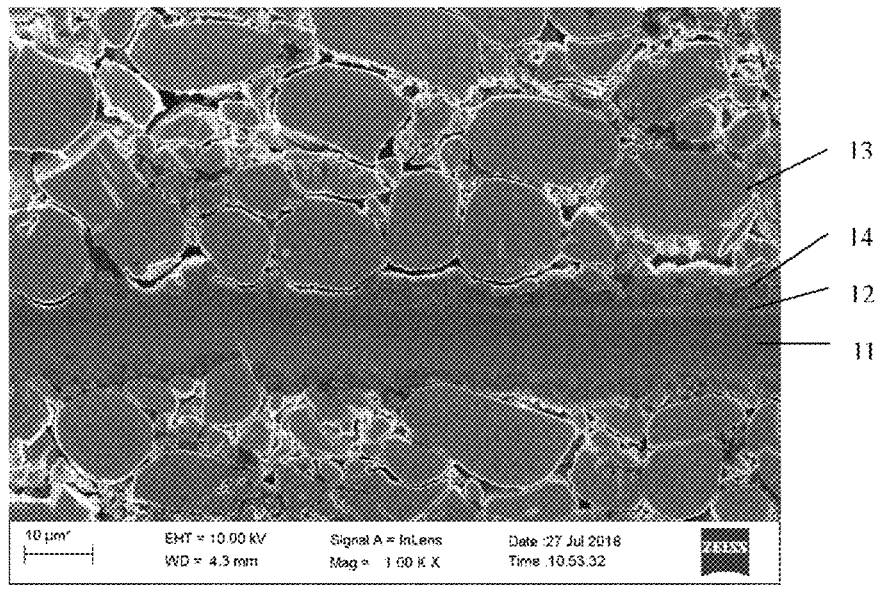
FIG. 3 is an enlarged cross-sectional view of a cathode under an electron microscope according to the embodiments of the present application.

FIG. 3 is an enlarged cross-sectional view of a cathode under an electron microscope according to the embodiments of the present application.

Compared with the preparation technique of the dual cold pressing process, the preparation technique of the cathode in the embodiment of the present application omits the cold pressing treatment before the coating of the second cathode active material layer slurry. Since the first cathode active material layer 12 is not subjected to the cold pressing treatment, the first cathode active material layer 12 has large pores, loosely packed particles and a coarse surface. When the second cathode active material layer slurry is coated on the first cathode active material layer 12, the second cathode active material layer slurry may penetrate the first cathode active material layer 12 and the binder in the second cathode active material layer 13 may be miscible with the binder in the first cathode active material layer 12. As shown in FIG. 3, in the cathode formed by the subsequent drying and cold pressing treatment, the second cathode active material is embedded in the first cathode active material layer 12 and forms a continuous transition layer 14 with the first cathode active material at the interface between the first cathode active material layer 12 and the second cathode active material layer 13. In the transition layer, the first cathode active material and the second cathode active material are irregularly staggered with each other, which avoids the obvious interface between the first cathode active material layer 12 and the second cathode active material layer 13. Further, the formation of the transition layer 14 results in an increase in the contact area, the interaction force and the adhesion between the first cathode active material in the first cathode active material layer 12 and the second cathode active material in the second cathode active material layer 13, so that the probability of the second cathode active material layer 13 falling off from the first cathode active material layer 12 under an external force (such as nail penetration) is reduced, thereby effectively avoiding the short-circuit mode in which the heat generating power is maximized due to direct contact between the cathode current collector and the negative active material layer. Finally, due to the increase in the contact area and the interaction force between the first cathode active material and the second cathode active material, the impedance at the interface between the first cathode active material and the second cathode active material decreases, so that the lithium ion exchange of the electrode assembly in the lithium-ion battery is enhanced, thereby improving the cycle characteristics of the lithium-ion battery.

Figure 4:
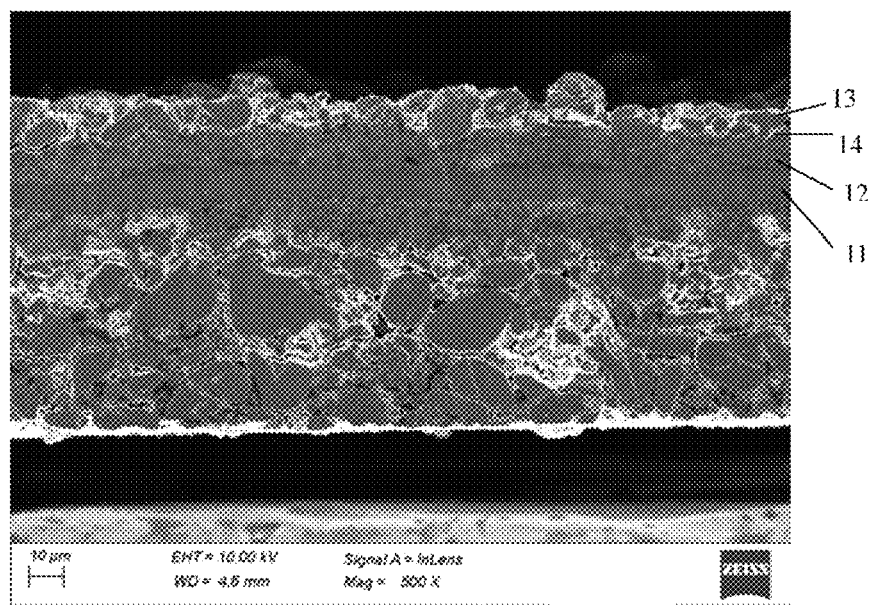
FIG. 4 is an enlarged cross-sectional view of a cathode after a peeling test under an electron microscope according to the embodiments of the present application.

FIG. 4 is an enlarged cross-sectional view of a cathode after a peeling test under an electron microscope according to the embodiments of the present application. As shown in FIG. 4, when the peeling test is performed on the cathode of the present application, the peeling position is mainly in the second cathode active material layer 13, and the interface between the cathode current collector 11 and the first cathode active material layer 12, the first cathode active material layer 12 and the transition layer 14 are not peeled off, which illustrates that the first cathode active material and the second cathode active material "interlock with each other" to enhance the adhesion.

In some embodiments of the present application, the first cathode active material has a smaller particle size, thereby enabling an increased coverage and adhesion to the cathode current collector. The particle size of the active material may be measured by a Malvern particle size analyzer: the active material is dispersed in a dispersant (ethanol or acetone, or other surfactants), and after 30 min of ultrasound processing, the sample is added to the Malvern particle size analyzer to start the test. The first cathode active material has a particle size (Dv50), which accounts for 50% of the cumulative volume of the small particle size side in volume-based particle size distribution, of from about 0.2 μm to about 15 μm, and a particle size (Dv90), which accounts for 90% of the cumulative volume of the small particle size side in volume-based particle size distribution, of less than or equal to about 30 μm.

In some embodiments of the present application, in order to avoid damage to the first cathode active material layer 12 by the second cathode active material in the second cathode active material layer 13 during cold pressing and to ensure the maximum adhesion between the first cathode active material layer 12 and the second cathode active material layer 13, the first cathode active material Dv50: the second cathode active material Dv50 is about 1:1 to about 40:1.

According to some embodiments of the present application, the first cathode active material and the second cathode active material each independently have an active material included, and the active material is selected from the group consisting of lithium cobaltate, lithium iron phosphate, sodium iron phosphate, lithium manganese iron phosphate, lithium vanadium phosphate, sodium vanadium phosphate, lithium vanadium oxy-phosphate, sodium vanadium oxy-phosphate, lithium vanadate, lithium manganate, lithium nickelate, lithium nickel cobalt manganese oxide, lithium-rich manganese-based material, lithium nickel cobalt aluminum oxide, lithium titanate and combinations thereof.

In some embodiments of the present application, the first cathode active material layer 12 and the second cathode active material layer 13 further include a binder, and the binder includes, but is not limited to, one or a combination of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene and styrene butadiene rubber. The content of the binder of the first cathode active material layer 12 is about 1.5 wt % to about 6 wt % based on the total weight of the first cathode active material layer 12, and the content of the binder of the second cathode active material layer 13 is about 0.5 wt % to about 4 wt % based on the total weight of the second cathode active material layer 13.

In some embodiments of the present application, the content of the binder of the first cathode active material layer 12 is greater than the content of the binder of the second cathode active material layer 13, thereby ensuring the adhesion between the first cathode active material layer 12 and the cathode current collector 11, and avoiding the occurrence of a cathode current collector-negative active material layer or cathode current collector-steel nail-negative active material layer short-circuit mode during the nail penetration test. Further, since the content of the binder of the first cathode active material layer 12 is high, the first cathode active material layer 12 has high resistance properties. During nail penetration, the short-circuit resistance is large, and the short-circuit power is low, so the thermal runaway of the electrode assembly can be prevented.

In some embodiments of the present application, the first cathode active material layer 12 needs a certain thickness before the cold pressing treatment to ensure the adhesion between the first cathode active material layer 12 and the second cathode active material layer 13. Further, since the content of the binder in the first cathode active material layer 12 is greater than the content of the binder in the second cathode active material layer 13, the thickness of the first cathode active material layer 12 cannot be too great, otherwise the energy density of lithium-ion battery will be reduced.

In some embodiments of the present application, the thickness of the first cathode active material layer 12 is about 0.5 µm to about 30 µm. In particular, the thickness of the first cathode active material layer 12 is not less than the Dv90 of the first cathode active material, thereby ensuring more coverage of the first cathode active material layer 12 on the cathode current collector 11, wherein the coverage is the total coated area of the region to be coated minus the exposed area of the layer to be coated exposed through the pores in the coating layer as a percentage of the total coated area.

Due to small particles, the compaction density of the first cathode active material is relatively low. Therefore, in order to achieve a high energy density of the lithium-ion battery, the thickness ratio of the second cathode active material layer 13 is increased. In some embodiments of the present application, the thickness of the second cathode active material layer 13 is about 30 µm to about 80 µm, and the thicker the second cathode active material layer 13 is, the higher the energy density of the lithium-ion battery is.

In some embodiments of the present application, during the cold pressing treatment, due to the floating of the binder in the first cathode active material layer 12 and the infiltration of the binder in the second cathode active material layer 13, the binder in the first cathode active material layer 12 is miscible with the binder in the second cathode active material layer 13. Therefore, the content of the binder in the transition layer 14 at the interface between the first cathode active material layer 12 and the second cathode active material layer 13 is greater than the content of the binder of the first cathode active material layer 12 and the second cathode active material layer 13.

In some embodiments of the present application, the first cathode active material layer includes a first conductive agent, and the second cathode active material layer includes a second conductive agent, wherein the first conductive agent and the second conductive agent include, but are not limited to, one or a combination of carbon nanotubes, conductive carbon black, acetylene black, graphene and Ketjen black.

In some embodiments of the present application, the content of the first conductive agent is about 0.5 wt % to about 5 wt % based on the total weight of the first cathode active material layer, and the content of the second conductive agent is about 0.5 wt % to about 5 wt % based on the total weight of the second cathode active material layer.

In some embodiments of the present application, the specific surface area of the first cathode active material is about 0.2 $m^2$/g to about 18 $m^2$/g. A too small specific surface area of the first cathode active material combined with large particles in the first cathode active material may result in the first cathode active material layer having difficulty in achieving greater coverage, thereby reducing the safety performance of the lithium-ion battery. On the other hand, if the specific surface area of the first cathode active material is too large, the side reaction with the electrolytic solution is intensified, thereby reducing the cycle characteristics of the lithium-ion battery, resulting in deterioration of the electrochemical performance of the lithium-ion battery.

In some embodiments of the present application, the ratio of the specific surface area of the first conductive agent to the specific surface area of the first cathode active material is less than or equal to 11. By controlling the ratio of the specific surface area of the first conductive agent to the specific surface area of the first cathode active material, the resistance of the first cathode active material layer can be adjusted to be maintained in a suitable range, so that the resistance between the cathode current collector and the nail is significantly increased during the nail penetration test, thereby avoiding the occurrence of a cathode current collector-steel and a nail-negative active material layer short-circuit mode, preventing ignition or explosion due to a short circuit, and further improving the safety performance of the lithium-ion battery.

Further, the first cathode active material layer 12 or the second cathode active material layer 13 may be subjected to some other treatments, or the cathode current collector 11 may be subjected to some treatments, such as roughness treatment, heat treatment, etc. The principle or effect may be to enhance adhesion to the cathode current collector, although not described in detail in the present application, it is included within the scope of the present application.

Some embodiments of the present application further provide an electrochemical device including the cathode of the present application. In some embodiments, the electrochemical device is a lithium-ion battery. The lithium-ion battery includes a cathode of the present application, an anode, a separator and an electrolyte, wherein the anode includes a negative active material layer and a negative current collector.

The cathode current collector of the cathode in some embodiments of the present application may be aluminum foil or nickel foil, and the negative current collector of the anode may be copper foil or nickel foil. However, other cathode current collectors and negative current collectors commonly used in the art may be used.

The conductive agent and the binder of the negative active material layer are similar to the conductive agent and the binder of the cathode active material layer described above, and the descriptions thereof are omitted herein. The negative active material layer includes a negative active material including, but not limited to, selected from the group consisting of carbon materials, metal compounds, oxides, sulfides, nitrides of lithium such as $LiN_3$, lithium metal, metal elements and semimetal elements that form alloys with lithium, polymer materials, and combinations thereof.

In the above negative active materials, examples of the carbon material may include low graphitized carbon, easily graphitizable carbon, artificial graphite, natural graphite, mesophase carbon microspheres, soft carbon, hard carbon, pyrolytic carbon, coke, glassy carbon, organic polymer compound sintered body, carbon fibers and activated carbon, wherein the coke may include pitch coke, needle coke and petroleum coke. The organic polymer compound sintered body refers to a material obtained by calcining a polymer material such as a phenol plastic or a furan resin at a suitable temperature to carbonize it, and some of these materials are classified into low graphitized carbon or easily graphitizable carbon. Examples of the polymer material may include polyacetylene and polypyrrole.

Further, in the above negative active material, a material whose charging and discharging voltages are close to the charging and discharging voltages of lithium metal is selected. This is because the lower the charging and discharging voltages of the negative active material, the easier it is for the lithium-ion battery to obtain a higher energy density. The negative active material may be a carbon material because their crystal structures change little during charging and discharging, and therefore, better cycle characteristics and greater charging and discharging capacities can be obtained. In particular, graphite may be selected because it can provide a large electrochemical equivalent and high energy density.

Further, the negative active material may include elemental lithium metal, a metal element and a semimetal element capable of forming an alloy together with lithium (Li), an alloy and a compound including such element, etc. In particular, they are used together with carbon materials to obtain good cycle characteristics and high energy density. In addition to the alloys including two or more metal elements, the alloys used herein also include alloys containing one or more metal elements and one or more semimetal elements. The alloy may be in the form of a solid solution, a eutectic crystal (eutectic mixture), an intermetallic compound, or a mixture thereof.

Examples of the metal elements and the semimetal elements may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of the above alloys and compounds may include a material having a chemical formula: $Ma_sMb_tLi_u$, and a material having a chemical formula: $Ma_pMc_qMd_r$. In these chemical formulae, Ma represents at least one of the metal elements and semimetal elements capable of forming an alloy together with lithium; Mb represents at least one of the metal elements and semimetal elements other than lithium and Ma; Mc represents at least one of the non-metal elements; Md represents at least one of metal elements and semimetal elements other than Ma; and s, t, u, p, q and r satisfy s>0, t≥0, u≥0, p>0, q>0 and r≥0.

Further, an inorganic compound not including lithium (Li), such as $MnO_2$, $V_2O_5$, $V_6O_{13}$, NiS and MoS, may be used in the negative active material layer.

The separator in some embodiments of the present application includes, but is not limited to, at least one selected from the group consisting of polyethylene, polypropylene, polyethylene terephthalate, polyimide and aramid. For example, the polyethylene includes at least one component selected from the group consisting of high-density polyethylene, low-density polyethylene and ultra-high molecular weight polyethylene. In particular, polyethylene and polypropylene, which have a good effect on preventing short circuits, can improve the stability of the battery by the shutdown effect.

The surface of the separator may further include a porous layer, the porous layer is disposed on at least one surface of the separator, the porous layer includes inorganic particles and a binder, and the inorganic particles are selected from one or a combination of aluminum oxide ($Al_2O_3$), silicon oxide ($SiO_2$), magnesium oxide (MgO), titanium oxide ($TiO_2$), hafnium oxide ($HfO_2$), tin oxide ($SnO_2$), cerium dioxide ($CeO_2$), nickel oxide (NiO), zinc oxide (ZnO), calcium oxide (CaO), zirconium dioxide ($ZrO_2$), yttrium oxide ($Y_2O_3$), silicon carbide (SiC), boehmite, aluminum hydroxide, magnesium hydroxide, calcium hydroxide and barium sulfate. The binder is selected from one or a combination of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene and polyhexafluoropropylene.

The porous layer can improve heat resistance, oxidation resistance and electrolytic solution wettability of the separator, and enhance the binding property between the separator and the cathode or anode.

The lithium-ion battery of the present application further includes an electrolyte, the electrolyte may be one or more of a gel electrolyte, a solid electrolyte and an electrolytic solution, and the electrolytic solution includes a lithium salt and a non-aqueous solvent.

In some embodiments of the present application, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. For example, the lithium salt is $LiPF_6$ because it can provide a high ionic conductivity and improve the cycle characteristic.

The non-aqueous solvent may be a carbonate compound, a carboxylate compound, an ether compound, other organic solvents, or a combination thereof.

The carbonate compound may be a chain carbonate compound, a cyclic carbonate compound, a fluorocarbonate compound, or a combination thereof.

Examples of the above chain carbonate compounds are diethyl carbonate (DEC), dimethyl carbonate (DMC), dipropyl carbonate (DPC), methyl propyl carbonate (MPC), ethyl propyl carbonate (EPC), methyl ethyl carbonate (MEC) and combinations thereof. Examples of the cyclic carbonate compounds are ethylene carbonate (EC), propylene carbonate (PC), butylene carbonate (BC), vinyl ethylene carbonate (VEC), propyl propionate (PP) and combinations thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate and combinations thereof.

Examples of the above carboxylate compounds are methyl acetate, ethyl acetate, n-propyl acetate, tert-butyl acetate, methyl propionate, ethyl propionate, propyl propionate, γ-butyrolactone, decanolide, valerolactone, DL-Mevalonolactone, caprolactone, methyl formate, and combinations thereof.

Examples of the above ether compounds are dibutyl ether, tetraglyme, diglyme, 1,2-dimethoxyethane, 1,2-diethoxyethane, ethoxymethoxyethane, 2-methyltetrahydrofuran, tetrahydrofuran, and combinations thereof.

Examples of the other organic solvents mentioned above are dimethyl sulfoxide, 1,2-dioxolane, sulfolane, methylsulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate esters and combinations thereof.

In some embodiments of the present application, the cathode, the separator and the anode are sequentially wound or stacked into an electrode assembly, and then loaded into, for example, an aluminum plastic film, the electrolytic solution is injected, and formation and packaging are performed to prepare the lithium-ion battery.

Those skilled in the art will appreciate that while the above is illustrated with a lithium-ion battery, the electrochemical device of the present application further includes any other suitable electrochemical device. Such an electrochemical device includes any device that generates an electrochemical reaction without departing from the disclosure of the present application, and its specific examples include all kinds of primary batteries, secondary batteries, fuel cells, solar cells, or capacitors. In particular, the electrochemical device is a lithium secondary battery, including a lithium metal secondary battery, a lithium-ion secondary battery, a lithium polymer secondary battery or a lithium-ion polymer secondary battery.

The electrochemical device of the present application includes electrochemical devices of different structures. In the embodiments, a wound-type lithium-ion battery is taken as an example, but the electrochemical device of the present application may include an electrochemical device in a laminate structure, a folded structure or a multi-tab structure, all of which are included within the scope of the present application.

The use of the electrochemical device of the present application is not particularly limited and can be used for any use known in the art. In one embodiment, the electrochemical device of the present application may be used for, but not limited to, a notebook computer, a pen input computer, a mobile computer, an e-book player, a portable phone, a portable fax machine, a portable copy machine, a portable printer, stereo headphones, a video recorder, a liquid crystal display television, a portable cleaner, a portable CD player, a mini disk, a transceiver, an electronic notebook, a calculator, a memory card, a portable recorder, a radio, a backup power device, a motor, a car, a motorcycle, a power bicycle, a bicycle, a lighting fixture, a toy, a game console, a clock, an electric tool, a flash lamp, a camera, a large household battery, a lithium-ion capacitor and the like.

Some specific embodiments and comparative embodiments are listed below and subjected to battery capacity tests and battery nailing tests, so as to better illustrate the present application. Those skilled in the art will appreciate that the preparation methods described herein are merely exemplary embodiments, and that any other suitable preparation method is also within the scope of the present application.

Embodiment 1

Aluminum foil was adopted as a cathode current collector. The specific surface areas of the lithium iron phosphate particles (i.e., the first cathode active material), and the conductive carbon black and carbon nanotubes (both of which are the first conductive agent) were firstly tested to select a material having a suitable specific surface area. Subsequently, the surface of the aluminum foil was uniformly coated with a layer of lithium iron phosphate slurry, i.e., a first cathode active material layer slurry, wherein the lithium iron phosphate had a particle size Dv50 of 3 µm, Dv90 of 10 µm, and a specific surface area of 12 m²/g. The first cathode active material layer slurry, consisting of 96.2 wt % of lithium iron phosphate (LiFePO$_4$), 3.0 wt % of polyvinylidene fluoride (PVDF), 0.3 wt % of conductive carbon black and 0.5 wt % of carbon nanotubes, was coated to form a first cathode active material layer, wherein the ratio of the specific surface area of the first conductive agent to the specific surface area of the first cathode active material was 5.3, and the first cathode active material layer was then dried at 85° C. The dried first cathode active material layer was coated with a layer of lithium cobaltate slurry, i.e., a second cathode active material layer slurry (wherein the lithium cobaltate had a particle size Dv50 of 13 µm and Dv90 of 38 µm). The second cathode active material layer slurry, consisting of 97 wt % of lithium cobaltate (LCO), 1.6 wt % of polyvinylidene fluoride (PVDF) and 1.4 wt % of conductive carbon black, and a solvent N-methylpyrrolidone (NMP) formed a second cathode active material layer covering the first cathode active material layer, and the second cathode active material layer was dried at 85° C. The sample was then subjected to cold pressing, cutting and slitting, and dried under vacuum at 85° C. for 4 h to obtain a cathode, wherein the cold pressing pressure was 60 T, and the cold pressing speed was 15 m/min. In the prepared cathode, the thickness of the first cathode active material layer was 6 µm, and the thickness of the second cathode active material layer was 54 µm.

FIG. 3 is an enlarged cross-sectional view (1000 times) of a cathode under a field emission scanning electron microscope (Model: ZEISS Sigma 300) according to the embodiments of the present application.

Copper foil was adopted as a negative current collector. The surface of the copper foil was uniformly coated with a layer of graphite slurry, consisting of 97.7 wt % of artificial graphite, 1.3 wt % of sodium carboxymethyl cellulose (CMC) and 1.0 wt % of styrene butadiene rubber (SBR), and dried at 85° C. The sample was then subjected to cold pressing, cutting and slitting, and dried under vacuum at 85° C. for 4 h to obtain an anode.

A solution of lithium salt LiPF$_6$ and a non-aqueous organic solvent (ethylene carbonate (EC):diethyl carbonate (DEC):propylene carbonate (PC):propylene propionate (PP):vinylene carbonate (VC)=20:30:20:28:2 by mass) mixed in a ratio of 8:92 by mass was used as an electrolyte for a lithium ion battery.

The cathode and the anode were slit and wound, and separated by a polyethylene separator, so as to prepare a wound electrode assembly. The electrode assembly was subjected to top side sealing, code spraying, vacuum drying, electrolytic solution injection and high-temperature standing, and then formation and packaging to obtain the finished lithium-ion battery.

Embodiment 2

The preparation method was the same as that of Embodiment 1, except that the cold pressing pressure in Embodiment 2 was 20 T.

Embodiment 3

The preparation method was the same as that of Embodiment 1, except that the cold pressing pressure in Embodiment 3 was 40 T.

Embodiment 4

The preparation method was the same as that of Embodiment 1, except that the cold pressing pressure in Embodiment 4 was 80 T.

Embodiment 5

The preparation method was the same as that of Embodiment 1, except that the cold pressing pressure in Embodiment 5 was 100 T.

Embodiment 6

The preparation method was the same as that of Embodiment 1, except that the cold pressing speed in Embodiment 6 was 5 m/min.

Embodiment 7

The preparation method was the same as that of Embodiment 1, except that the cold pressing speed in Embodiment 7 was 20 m/min.

Embodiment 8

The preparation method was the same as that of Embodiment 1, except that the cold pressing speed in Embodiment 8 was 30 m/min.

Embodiment 9

The preparation method was the same as that of Embodiment 1, except that the cold pressing speed in Embodiment 9 was 40 m/min.

Embodiment 10

The preparation method was the same as that of Embodiment 1, except that the ratio of the specific surface area of the first conductive agent to the specific surface area of the first cathode active material in Embodiment 10 was 1.3.

Embodiment 11

The preparation method was the same as that of Embodiment 1, except that the ratio of the specific surface area of the first conductive agent to the specific surface area of the first cathode active material in Embodiment 11 was 7.6.

Embodiment 12

The preparation method was the same as that of Embodiment 1, except that the ratio of the specific surface area of the first conductive agent to the specific surface area of the first cathode active material in Embodiment 12 was 9.1.

Embodiment 13

The preparation method was the same as that of Embodiment 1, except that the ratio of the specific surface area of the first conductive agent to the specific surface area of the first cathode active material in Embodiment 13 was 11.0.

Embodiment 14

The preparation method was the same as that of Embodiment 1, except that the ratio of the specific surface area of the first conductive agent to the specific surface area of the first cathode active material in Embodiment 14 was 11.6.

Comparative Embodiment 1

Aluminum foil was adopted as a cathode current collector. The surface of the aluminum foil was uniformly coated with a layer of lithium cobaltate slurry (wherein the lithium cobaltate had a particle size Dv50 of 13 μm and Dv90 of 38 μm). The lithium cobaltate slurry, consisting of 97 wt % of lithium cobaltate (LCO), 1.6 wt % of polyvinylidene fluoride (PVDF) and 1.4 wt % of conductive carbon black, and a solvent N-methylpyrrolidone (NMP) were coated to form a cathode active material layer, the cathode active material layer was dried at 85° C. And the sample was then subjected to cold pressing, cutting and slitting, and dried under vacuum at 85° C. for 4 h to obtain a cathode, wherein the cold pressing pressure was 60 T, and the cold pressing speed was 15 m/min. In the prepared cathode, the thickness of the cathode active material layer was 60 μm.

Copper foil was adopted as a negative current collector. The surface of the copper foil was uniformly coated with a layer of graphite slurry, consisting of 97.7 wt % of artificial graphite, 1.3 wt % of sodium carboxymethyl cellulose (CMC) and 1.0 wt % of styrene butadiene rubber (SBR), and dried at 85° C. The sample was then subjected to cold pressing, cutting and slitting, and dried under vacuum at 85° C. for 4 h to obtain an anode.

A solution of lithium salt $LiPF_6$ and a non-aqueous organic solvent (ethylene carbonate (EC):diethyl carbonate (DEC):propylene carbonate (PC):propylene propionate (PP):vinylene carbonate (VC)=20:30:20:28:2 by mass) mixed in a ratio of 8:92 by mass was used as an electrolyte for a lithium ion battery.

The cathode and the anode were slit and wound, and separated by a polyethylene separator, thereby preparing a wound electrode assembly. The electrode assembly was subjected to top side sealing, code spraying, vacuum drying, electrolytic solution injection and high-temperature standing, and then formation and packaging to obtain the finished lithium-ion battery.

Comparative Embodiment 2

Aluminum foil was adopted as a cathode current collector. The specific surface areas of the lithium iron phosphate particles (i.e., the first cathode active material), and the conductive carbon black and carbon nanotubes (both of which are the first conductive agent) were firstly tested to select a material having a suitable specific surface area. Subsequently, the surface of the aluminum foil was uniformly coated with a layer of lithium iron phosphate slurry, i.e., a first cathode active material layer slurry, wherein the lithium iron phosphate had a particle size Dv50 of 3 μm and Dv90 of 10 μm, and a specific surface area of 12 $m^2/g$. The first cathode active material layer slurry consisting of 96.2 wt % of lithium iron phosphate ($LiFePO_4$), 3.0 wt % of polyvinylidene fluoride (PVDF), 0.3 wt % of conductive carbon black and 0.5 wt % of carbon nanotubes, was coated to form a first cathode active material layer, wherein the ratio of the specific surface area of the first conductive agent to the specific surface area of the first cathode active material was 5.3, and the first cathode active material layer was dried at 85° C. The dried first cathode active material layer was then coated with a layer of lithium cobaltate slurry, i.e., a second cathode active material layer slurry. (wherein the lithium cobaltate had a particle size Dv50 of 13 μm and Dv90 of 38 μm) The second cathode active material layer slurry consisting of 97 wt % of lithium cobaltate (LCO), 1.6 wt % of polyvinylidene fluoride (PVDF) and 1.4 wt % of conductive carbon black, and a solvent N-methylpyrrolidone (NMP) formed a second cathode active material layer covering the first cathode active material layer, and the second cathode active material layer was dried at 85° C. And the sample was then subjected to cutting and slitting, and dried under vacuum at 85° C. for 4 h to obtain the cathode. In the prepared cathode, the thickness of the first cathode active material layer was 6 μm, and the thickness of the second cathode active material layer was 54 μm.

Figure 5:
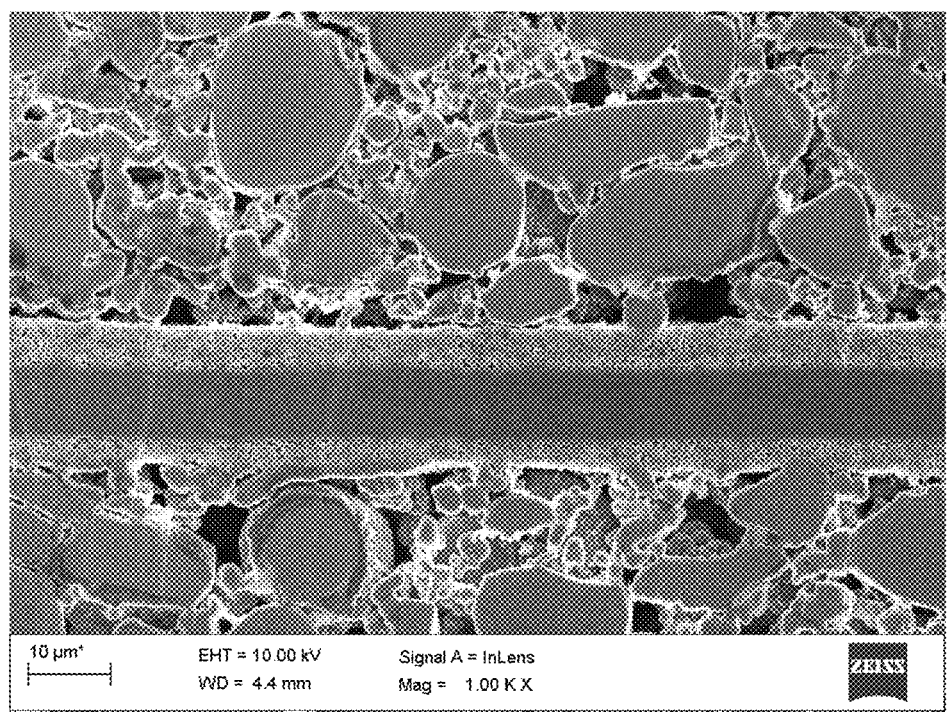
FIG. 5 is an enlarged cross-sectional view of a cathode which has not undergone any cold pressing treatment under an electron microscope.

FIG. 5 is an enlarged cross-sectional view (1000 times) of a cathode which has not undergone any cold pressing treatment under a field emission scanning electron microscope (Model: ZEISS Sigma 300).

Copper foil was adopted as a negative current collector. The surface of the copper foil was uniformly coated with a layer of graphite slurry, consisting of 97.7 wt % of artificial graphite, 1.3 wt % of sodium carboxymethyl cellulose (CMC) and 1.0 wt % of styrene butadiene rubber (SBR), and dried at 85° C. The sample was then subjected to cold pressing, cutting and slitting, and further dried under vacuum at 85° C. for 4 h to obtain the anode.

A solution of lithium salt $LiPF_6$ and a non-aqueous organic solvent (ethylene carbonate (EC):diethyl carbonate (DEC):propylene carbonate (PC):propylene propionate (PP):vinylene carbonate (VC)=20:30:20:28:2 by mass) mixed in a ratio of 8:92 by mass was used as an electrolyte for a lithium ion battery.

The cathode and the anode were slit and wound, and separated by a polyethylene separator, thereby preparing a wound electrode assembly. The electrode assembly was subjected to top side sealing, code spraying, vacuum drying, electrolytic solution injection and high-temperature standing, and then formation and packaging to obtain the finished lithium-ion battery.

After the finished lithium-ion batteries of the above embodiments and comparative embodiments were obtained, the capacity, thickness, width and length of the finished products were recorded to determine the volumetric energy density of the lithium-ion battery. A capacity test and a nail penetration test of the lithium-ion batteries of the above embodiments and comparative embodiments were subsequently carried out.

Capacity Test:

The lithium-ion battery to be tested was allowed to stand in a 25±3° C. environment for 30 minute, charged at a constant current of 0.5 C to a battery voltage of 4.4 V (rated voltage), and then charged at a constant voltage until the charge and discharge rate reached 0.05 C, and the lithium-ion battery to be tested was allowed to stand for 30 minutes. Then the lithium-ion battery to be tested was discharged to 3.0 V at a rate of 0.2 C, and allowed to stand for 30 minutes. Finally, the discharge capacity was taken as the actual battery capacity of the battery.

10 Lithium-ion battery energy density=discharge capacity/(length*width*thickness of lithium-ion battery).

Nail Penetration Test:

10 lithium-ion batteries to be tested were taken and charged at a constant current of 0.5 C at a normal temperature to a voltage of 4.4 V, and further charged at a constant voltage of 4.4 V to a current of 0.05 C to make them in a fully charged state at 4.4 V. After that, the battery was subjected to nail penetration under normal temperature conditions, wherein a nail with a diameter of 4 mm (steel nail, made of carbon steel, and having a taper of 16.5 mm and a total length of 100 mm) was used for nail penetration at a nail penetration speed of 30 mm/s, and the nail penetration depth was determined by the taper of the steel nail through the lithium-ion battery. Whether the lithium-ion battery produced smoke, fire or explosion was observed. If not, it was considered that the lithium-ion battery passed the nail penetration test.

The experimental parameters and measurement results of the embodiments and comparative embodiments are shown in Table 1 below.

TABLE 1

| Embodiment | First Cathode active material | Specific Surface Area of First Cathode active material ($m^2/g$) | Ratio of Specific Surface Area of First Conductive Agent to Specific Surface Area of First Cathode active material | Thickness of First Cathode active material Layer (μm) | Thickness of Second Cathode active material Layer (μm) | Cold Pressing Pressure (T) | Cold Pressing Speed (m/min) | Lithium-ion Battery Energy Density (Wh/L) | Nail Penetration Pass Rate |
|---|---|---|---|---|---|---|---|---|---|
| 1 | Lithium Iron Phosphate | 12 | 5.3 | 6 | 54 | 60 | 15 | 690 | 10/10 |
| 2 | Lithium Iron Phosphate | 12 | 5.3 | 6 | 54 | 20 | 15 | 680 | 5/10 |
| 3 | Lithium Iron Phosphate | 12 | 5.3 | 6 | 54 | 40 | 15 | 688 | 7/10 |
| 4 | Lithium Iron Phosphate | 12 | 5.3 | 6 | 54 | 80 | 15 | 693 | 10/10 |
| 5 | Lithium Iron Phosphate | 12 | 5.3 | 6 | 54 | 100 | 15 | 698 | 10/10 |
| 6 | Lithium Iron Phosphate | 12 | 5.3 | 6 | 54 | 60 | 5 | 691 | 10/10 |
| 7 | Lithium Iron Phosphate | 12 | 5.3 | 6 | 54 | 60 | 20 | 689 | 10/10 |
| 8 | Lithium Iron Phosphate | 12 | 5.3 | 6 | 54 | 60 | 30 | 689 | 10/10 |
| 9 | Lithium Iron Phosphate | 12 | 5.3 | 6 | 54 | 60 | 40 | 689 | 10/10 |
| 10 | Lithium Iron Phosphate | 12 | 1.3 | 6 | 54 | 60 | 15 | 690 | 10/10 |
| 11 | Lithium Iron Phosphate | 12 | 7.6 | 6 | 54 | 60 | 15 | 690 | 10/10 |
| 12 | Lithium Iron Phosphate | 12 | 9.1 | 6 | 54 | 60 | 15 | 690 | 10/10 |
| 13 | Lithium Iron Phosphate | 12 | 11 | 6 | 54 | 60 | 15 | 690 | 9/10 |
| 14 | Lithium Iron Phosphate | 12 | 11.6 | 6 | 54 | 60 | 15 | 690 | 5/10 |

TABLE 1-continued

| Comparative Embodiment | First Cathode active material | Specific Surface Area of First Cathode active material (m²/g) | Ratio of Specific Surface Area of First Conductive Agent to Specific Surface Area of First Cathode active material | Thickness of First Cathode active material Layer (μm) | Thickness of Second Cathode active material Layer (μm) | Cold Pressing Pressure (T) | Cold Pressing Speed (m/min) | Lithium-ion Battery Energy Density (Wh/L) | Nail Penetration Pass Rate |
|---|---|---|---|---|---|---|---|---|---|
| 1 | / | / | / | / | 60 | 60 | 15 | 700 | 0/10 |
| 2 | Lithium Iron Phosphate | 12 | 5.3 | 6 | 54 | / | / | 675 | 0/10 |

By comparing Comparative Embodiments 1 and 2 and Embodiment 1, as shown in FIG. 3, in Embodiment 1 of the present application, the two active material layers are firstly coated in the cathode preparation process and subjected to a cold pressing technique to form a transition layer between the first cathode active material layer and the second cathode active material layer, wherein the particles of the second cathode active material are embedded in the first cathode active material layer, so that the first cathode active material and the second cathode active material are irregularly staggered with each other without an obvious interface. In contrast, as shown in FIG. 5, the cathode without cold pressing treatment inevitably forms an obvious flat interface between the first cathode active material layer and the second cathode active material layer, which may result in the decrease of adhesion between the first cathode active material layer and the second cathode active material layer, so that the first cathode active material layer and the second cathode active material layer easily separate from each other, thereby reducing the nail penetration pass rate. It can be seen from Embodiments 1 to 5 that the increase of the cold pressing pressure can enhance the energy density of the lithium-ion battery. Correspondingly, the nail penetration pass rate of the lithium-ion battery increases as the cold pressing pressure increases.

It can be seen from Embodiments 1 and 6 to 9 that the cold pressing speed has little effect on the energy density of the lithium-ion battery.

It can be seen from Embodiments 1 and 10 to 14 that when the ratio of the specific surface area of the first conductive agent to the specific surface area of the first cathode active material exceeds 11, the nail penetration pass rate of the lithium-ion battery is lowered, thus the safety performance of the lithium-ion battery is lowered.

The above description summarizes the features of several embodiments, which will enable a person of ordinary skill in the art to understand the various aspects of the present application. A person of ordinary skill in the art can readily use this application as a basis for designing or modifying other compositions to achieve the same objectives and/or the same advantages as the embodiments herein. It is also to be understood by a person of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are carried out in a specific order, it should be understood that these operations can be combined, sub-divided, or reordered to form an equivalent method without departing from the teachings of the present application. Therefore, the order and grouping of operations are not a limitation to the present application unless specifically indicated herein.

What is claimed is:

1. An electrochemical device, comprising a cathode, wherein the cathode comprises:
    a cathode current collector;
    a first cathode active material layer comprising a first cathode active material and a first conductive agent; and
    a second cathode active material layer comprising a second cathode active material,
    wherein the first cathode active material layer is disposed between the cathode current collector and the second cathode active material layer, and the first cathode active material layer is formed on at least one surface of the cathode current collector; wherein the first cathode active material layer is firstly formed on the cathode current collector, and the second cathode active material layer is secondly formed on the first cathode active material layer, then the second cathode active material layer and the first cathode active material layer are pressed together;
    wherein the first cathode active material layer and the second cathode active material layer comprise a binder, and a content of the binder of the first cathode active material layer is greater than a content of the binder of the second cathode active material layer; and
    wherein a ratio of a specific surface area of the first conductive agent to a specific surface area of the first cathode active material is greater than 1.3 and less than 11.

2. The electrochemical device according to claim 1, wherein the second cathode active material is embedded in the first cathode active material layer and forms a transition layer with the first cathode active material at an interface between the first cathode active material layer and the second cathode active material layer.

3. The electrochemical device according to claim 1, wherein a thickness of the first cathode active material layer is in a range of about 0.5 μm to about 30 μm, and a thickness of the second cathode active material layer is in a range of about 30 μm to about 80 μm.

4. The electrochemical device according to claim 1, wherein a particle size with a cumulative volume of 90% of the first cathode active material is about 30 μm or less.

5. The electrochemical device according to claim 1, wherein an average particle size of the first cathode active material is about 0.2 μm to about 15 μm, and a ratio of the average particle size of the first cathode active material to an average particle size of the second cathode active material is about 1:1 to about 1:40.

6. The electrochemical device according to claim 1, wherein the first cathode active material and the second cathode active material are each independently selected from the group consisting of lithium cobaltate, lithium iron phosphate, sodium iron phosphate, lithium manganese iron phosphate, lithium vanadium phosphate, sodium vanadium phosphate, oxy-lithium-vanadium phosphate, oxy-sodium-vanadium phosphate, lithium vanadate, lithium manganate, lithium nickelate, lithium nickel cobalt manganese oxide, lithium-rich manganese-based material, lithium nickel cobalt aluminum oxide, lithium titanate and combinations thereof.

7. The electrochemical device according to claim 1, wherein the binder is selected from the group consisting of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene butadiene rubber and combinations thereof.

8. The electrochemical device according to claim 1, wherein the content of the binder of the first cathode active material layer is about 1.5 wt % to about 6 wt % based on a total weight of the first cathode active material layer, and the content of the binder of the second cathode active material layer is about 0.5 wt % to about 4 wt % based on a total weight of the second cathode active material layer.

9. The electrochemical device according to claim 2, wherein the transition layer comprises the binder.

10. The electrochemical device according to claim 9, wherein a content of the binder of the transition layer is greater than the content of the binder of the first cathode active material layer and the second cathode active material layer.

11. The electrochemical device according to claim 1, wherein the second cathode active material layer comprises a second conductive agent, wherein the first conductive agent and the second conductive agent are each independently selected from the group consisting of carbon nanotubes, conductive carbon black, graphene and combinations thereof.

12. The electrochemical device according to claim 11, wherein the first conductive agent and the second conductive agent are each independently selected from the group consisting of carbon nanotubes, conductive carbon black and combination thereof.

13. The electrochemical device according to claim 11, wherein the conductive carbon black comprises at least one of acetylene black or Ketjen black.

14. The electrochemical device according to claim 11, wherein a content of the first conductive agent is about 0.5 wt % to about 5 wt % based on a total weight of the first cathode active material layer, and a content of the second conductive agent is about 0.5 wt % to about 5 wt % based on a total weight of the second cathode active material layer.

15. The electrochemical device according to claim 1, wherein the specific surface area of the first cathode active material is about 0.2 m$^2$/g to about 18 m$^2$/g.

16. A method for manufacturing the electrochemical device of claim 1, the method comprising:
providing the cathode current collector;
firstly coating a first cathode active material layer slurry on the surface of the cathode current collector, and then drying the cathode active material layer slurry to form the first cathode active material layer;
coating a second cathode active material layer slurry on the first cathode active material layer, and then drying the second cathode active material layer slurry to form the second cathode active material layer; and
pressing together the second cathode active material layer and the first cathode active material layer to form the cathode of the electrochemical device.

17. The method of claim 16, wherein the second cathode active material layer and the first cathode active material layer are pressed together at a pressing pressure range of about 10 T to about 120 T and at a belt running speed of pressing of about 1 m/min to about 50 m/min.

18. The method of claim 16, wherein the second cathode active material layer and the first cathode active material layer are pressed together at a pressing pressure range of about 60 T to about 100 T.

19. An electronic device, comprising an electrochemical device, wherein the electrochemical device comprises a cathode, and the cathode comprises:
a cathode current collector;
a first cathode active material layer, comprising a first cathode active material and a first conductive agent; and
a second cathode active material layer, comprising a second cathode active material, wherein the first cathode active material layer is disposed between the cathode current collector and the second cathode active material layer, and the first cathode active material layer is formed on at least one surface of the cathode current collector; and wherein the first cathode active material layer is firstly formed on the cathode current collector, and the second cathode active material layer is secondly formed on the first cathode active material layer, then the second cathode active material layer and the first cathode active material layer are pressed together; and
wherein a ratio of a specific surface area of the first conductive agent to a specific surface area of the first cathode active material is greater than 1.3 and less than 11.

20. The electrochemical device according to claim 1, wherein the ratio of the specific surface area of the first conductive agent to the specific surface area of the first cathode active material is greater than 1.3 and less than 9.1.

* * * * *